United States Patent [19]

Syrier et al.

[11] Patent Number: 5,075,422
[45] Date of Patent: Dec. 24, 1991

[54] PROCESS FOR THE PREPARATION OF POLYKETONE COPOLYMERS AND COPOLYMER WASH WITH LIQUID COMPRISING CARBOXYLIC COMPOUND

[75] Inventors: Johannes L. M. Syrier; Gerrit G. Rosenbrand; Peter Richters, all of Amsterdam, Netherlands

[73] Assignee: Shell Oil Company, Houston, Tex.

[21] Appl. No.: 574,028

[22] Filed: Aug. 29, 1990

[30] Foreign Application Priority Data

Feb. 23, 1990 [GB] United Kingdom ................. 9004158

[51] Int. Cl.$^5$ .............................................. C08G 67/02
[52] U.S. Cl. ................................... 528/486; 528/392; 528/495; 528/496
[58] Field of Search ................. 528/486, 495, 496, 392

[56] References Cited

U.S. PATENT DOCUMENTS

| 2,495,286 | 1/1950 | Brubaker | 260/63 |
|---|---|---|---|
| 3,694,412 | 9/1972 | Nozaki | 260/63 |
| 4,786,714 | 11/1988 | Drent | 528/392 |
| 4,788,279 | 11/1988 | Drent | 528/392 |
| 4,798,884 | 1/1989 | Brons | 528/491 |
| 4,818,810 | 4/1989 | Drent | 528/392 |
| 4,835,250 | 5/1989 | Drent | 528/392 |
| 4,843,144 | 6/1989 | van Broekhoven et al. | 528/392 |
| 4,855,400 | 8/1989 | van Broekhoven et al. | 528/486 |
| 4,874,736 | 10/1989 | Drent | 502/165 |
| 4,880,903 | 11/1989 | van Broekhoven et al. | 528/392 |

FOREIGN PATENT DOCUMENTS

| 0121965 | 10/1984 | European Pat. Off. . |
| 0181014 | 5/1986 | European Pat. Off. . |
| 0228733 | 7/1987 | European Pat. Off. . |
| 0229408 | 7/1987 | European Pat. Off. . |
| 0251373 | 1/1988 | European Pat. Off. . |
| 1081304 | 8/1967 | United Kingdom . |

Primary Examiner—Harold D. Anderson

[57] ABSTRACT

Process for the preparation of copolymers of carbon monoxide with one or more olefinically unsaturated compounds, by copolymerizing the monomers in the presence of a catalyst composition containing a Group-VIII metal and washing the formed copolymer by contacting the copolymer with a liquid which contains, dissolved in a solvent, a dicarboxylic or tricarboxylic acid having up to 8 carbon atoms, or a zinc, aluminum or magnesium salt thereof.

20 Claims, No Drawings

PROCESS FOR THE PREPARATION OF POLYKETONE COPOLYMERS AND COPOLYMER WASH WITH LIQUID COMPRISING CARBOXYLIC COMPOUND

FIELD OF THE INVENTION

This invention relates to a process for the preparation of copolymers of carbon monoxide with one or more olefinically unsaturated compounds, by copolymerizing the monomers in the presence of a catalyst composition containing a Group-VIII metal.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group-VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The copolymers of the invention are linear polymers and they are characterized by having a repeating structure [A-CO] which implies that a unit A is positioned left and right in between carbonyl units. A is a unit derived from the olefinically unsaturated compound. The term "copolymer" includes terpolymers in which different units A are present. Examples of suitable olefinically unsaturated compounds yielding a unit A are ethene, propene, butene, octene, styrene and acrylate esters. While these copolymers have attractive physical and mechanical properties such as yield stress, tensile strength, impact strength and flexural modulus, their processing properties leave room for improvement.

SUMMARY OF THE INVENTION

The present invention relates to a process for the preparation of copolymers of carbon monoxide with one or more olefinically unsaturated compounds, by copolymerizing the monomers in the presence of a catalyst composition containing a Group VIII metal and washing the formed copolymer by contacting the copolymer with a liquid, characterized in that the liquid contains, dissolved in a solvent, a mono-, di- or tricarboxylic acid having up to 8 carbon atoms, or a zinc, aluminium or magnesium salt thereof. The invention further relates to copolymers whenever prepared by a process of the invention, and to shaped articles comprising said copolymers.

DETAILED DESCRIPTION OF THE INVENTION

Melt processing, e.g. extrusion, of these copolymers, especially those with an intrinsic viscosity, or limiting viscosity number (LVN), above 2.0 dl/g (measured at 60° C. in m-cresol) is adversely affected by an increase of the viscosity of the melt during processing. This increase in melt viscosity is related to the decreased stability of the copolymers at temperatures which are typically applied in these operations. Since copolymers with a high LVN have better physical properties as engineering thermoplastics than copolymers with a low LVN, this melt processing problem needs to be solved. Especially in fiber and sheet applications, melt-extrusion is a critical step, even for copolymers with a low LVN.

The processability of the copolymers is unfavorably influenced by the presence of impurities in the copolymers as obtained from the copolymerization reactor. Examples of such impurities are catalyst residues, copolymers with a relatively low molecular weight, i.e. oligomers, and trace impurities originating from the monomer feedstock and/or from the solvents used. Therefore, there is a need for a suitable work-up procedure by which said impurities may be removed from the polymer.

A process for the preparation of copolymers of carbon monoxide with one or more olefinically unsaturated compounds, by copolymerizing the monomers in the presence of a catalyst composition containing a Group-VIII metal and washing the formed copolymer by contacting the copolymer with a liquid, wherein the washing is carried out in the absence of oxygen, is known from U.S. Pat. No. 4,798,884 (Brons et al.). It has been shown that this procedure brings about a reduction in the content of impurities in the copolymer. It now appears desirable, however, that the melt stability of the polymer obtained by this work-up procedure is improved even further, especially for melt processing operations in commercial production of molded parts and extrusion at commercial scale of fibers and sheets.

It has now suprisingly been found that, by washing the copolymers with a liquid which contains a dissolved carboxylate, e.g., a carboxylic acid, a copolymer is obtained which possesses a better stability at the melt processing temperature than a reference copolymer. This reference copolymer is treated in the same way, with the exception that the addition of the carboxylate to the washing liquid is omitted. This difference in stability is judged from the rate of weight loss of the copolymers upon heating in nitrogen and from color development upon melt processing by compression molding. Washing the copolymerization product with a liquid which contains a dissolved carboxylate is relatively simply implemented in a manufacturing process for the production of the copolymers. It may be advantageous to carry out said washing in the absence of oxygen.

The present invention therefore relates to a process for the preparation of copolymers of carbon monoxide with one or more olefinically unsaturated compounds, by copolymerizing the monomers in the presence of a catalyst composition containing a Group VIII metal and washing the formed copolymer by contacting the copolymer with a liquid, characterized in that the liquid contains, dissolved in a solvent, a mono-, di- or tricarboxylic acid having up to 8 carbon atoms, or a zinc, aluminium or magnesium salt thereof. The invention further relates to copolymers whenever prepared by a process of the invention, and to shaped articles comprising said copolymers.

Mono-, di- or tricarboxylic acids consisting of carbon, hydrogen and oxygen and having up to 8 carbon atoms, as well as their zinc, aluminium or magnesium salts may be used in the process of the invention. Examples of such compounds are formic acid, acetic acid, citric acid, magnesium acetate and zinc citrate. Although the use of these salts may assist in avoiding a high acidity in the polymer, it may be more difficult to remove them completely from the polymer by additional washings. Therefore, it is preferred to apply a liquid which contains a mono-, di- or tricarboxylic acid. More preferably, the liquid contains a dicarboxylic acid, for example malonic acid, barbituric acid or phthalic acid. It is advantageous to choose an acid which decomposes into volatile products when heated at a temperature in the range of from 100° to 300° C. Washing with a liquid which contains oxalic acid gives a very good result.

The skilled reader will understand that the liquid applied in the process of the invention contains a minor amount, i.e. less than 50%, of the carboxylic acid or the corresponding zinc, aluminium or magnesium salt and a major amount, i.e. more than 50%, of a solvent. Suitably, the concentration of the mono-, di- or tricarboxylic acid or the zinc, aluminium or magnesium salt thereof in the liquid amounts to 0.1 to 200 g/l, more suitably, the concentration amounts to 1 to 50 g/l, and most suitably 5 to 20 g/l. An excellent result has been obtained with a concentration of 10 g/l.

The skilled reader will appreciate that the washing procedure of the invention involves more steps than contacting the copolymer with the liquid of the invention. Suitably, the slurry, obtained by contacting the copolymer with the liquid, is agitated and thereafter subjected to a suitable solid/liquid separation technique, such as filtration or centrifugation, in order to recover the copolymer. A substantial amount of the carboxylic acid or the salt will be removed from the copolymer upon applying said separation technique. It may be advantageous to reduce the amount of the remnants further, for example, by repeating the washing step using a liquid which does not contain the carboxylic acid or the salt. It may, therefore, be preferred to apply a procedure in which the washing comprises contacting the copolymer with the liquid of the invention, followed by at least one washing which comprises contacting the copolymer with a second liquid, the solvent.

The solvent to be applied in the liquid of the invention conveniently fulfills certain conditions. For example, it may be essentially a non-solvent for the copolymer while being a solvent for the carboxylic acid or the corresponding zinc, aluminium or magnesium salt, to the extent that a sufficient amount of the acid or the salt can be dissolved. Since there is a preference for applying carboxylic acids in the liquid, the solvent is preferably essentially organic, i.e., containing carbon and hydrogen and, optionally, nitrogen and/or oxygen. Liquid alcohols are excellent solvents for carboxylic acids, and when they possess 5 carbon atoms or less they are easily removable from the copolymer by evaporation, thus facilitating the final drying of the copolymer. Thus, more preferably, the solvent comprises a liquid alcohol having up to 5 carbon atoms, and, particularly, 3 carbon atoms. Very good results have been achieved with methanol.

The copolymerization step in the process of the invention is effected by catalyst compositions comprising a Group-VIII metal, i.e. a metal selected from Group-VIII of the Periodic Table, from which group, typically, palladium or nickel are chosen. Suitably, the catalyst composition contains a palladium compound, a dentate ligand and an anion of an acid with a pKa of less than 6. Suitable dentate ligands are those containing at least two phosphorus, nitrogen or sulphur dentate groups by which the dentate ligand may form a complex with the Group-VIII metal. Although the dentate ligands may have more than two ligand groups, such as 1,8-bis[bis(2-methoxyphenyl)phosphino]-2,7-bis[bis(2-methoxyphenyl)phosphinomethyl]octane, it is preferred to apply a bidentate ligand, e.g., 1,3-bis(diphenylphosphino)propane and 1,3-bis[bis(2-methoxyphenyl)phosphino]propane. Acids with pKa lower than 6 provide active catalyst compositions, however, there is preference for applying an acid which has a pKa of less than 2.

The copolymer prepared by the process of the invention is a linear alternating copolymer of carbon monoxide with one or more olefinically unsaturated compounds. Typically, it is a copolymer of carbon monoxide with ethylene or it is a copolymer of carbon monoxide with ethylene and another olefinically unsaturated compound, the latter copolymer having a melting point in the range of from 150° to 245° C. The olefinically unsaturated compound may contain functional groups like carboxylic ester and carboxylic amide groups, but preferably the olefinically unsaturated compound is a hydrocarbon having less than 10 carbon atoms, for example, an α-olefin, like octene-1 or decene-1, an aromatic olefin, like styrene, or an internal olefin, like norbornadiene. Most preferably, the olefinically unsaturated hydrocarbon is propylene.

Obviously, the melting point of the copolymer is dependent of the olefinically unsaturated compound which has been incorporated. If there are more olefinically unsaturated compounds, the melting point also depends on the ratio at which they have been incorporated. Although the copolymers of carbon monoxide with ethylene and another olefinically unsaturated compound suitably have a melting point in the range of from 150° to 245° C., there is a preference for preparing copolymers which have a melting point in the range of from 210° to 240° C.

As stated herein before, the limiting viscosity number (LVN) of the copolymer is important with respect to a number of physical properties. Preferably, copolymers are prepared having an LVN in the range of from 0.5 to 4.0 dl/g, or, more preferably, in the range of from 1.0 to 2.5 dl/g.

The copolymers of this invention are very suitable ingredients in copolymer compositions because, in comparison with other copolymers, they improve the stability of the compositions at the temperatures applied in melt processing the compositions into shaped articles. One or more of the other components of the compositions may, for example, be chosen from polymers, mineral fillers, reinforcing fibers, flame retardants, etc. The polymers may be, for example, polyolefin, polyacetal or thermoplastic polyester. The compositions may also contain one or more additives which improve, e.g., oxidative stability or UV stability. Such additional additives may, for example, be selected from the group formed by sterically hindered phenolic compounds, aromatic amines, hydroxybenzophenones, hydroxyphenylbenzotriazoles, aluminium hydroxide, acid amides of carboxylic acids, and copolymers of ethylene and acrylic acid or methacrylic acid. Some of these may be well-known additives for polymers, e.g. those marketed under the trademarks "IRGANOX", "IONOL", "TINUVIN", "CYASORB" and "NAUGARD". Suitably the hindered phenolic compounds are selected from 2,5-dialkylphenols, from esters of a straight chain alcohol and a hydroxy,dialkylphenyl-substituted carboxylic acid, from 1,2-bis(acetyl)hydrazines in which the acetyl group carries a hydroxy, dialkylphenyl substituent, from N,N'-bis(acetoxyalkyl)oxalamides in which the acetyl group carries a hydroxy, dialkylphenyl substituent, and from alpha-N,omega-N-bis(acetyl)-diamines in which the acetyl group carries a hydroxy,-dialkylphenyl substituent. Suitable aromatic amines are selected from the group formed by the diphenylamines, such as 4,4'-bisbenzyldiphenylamines or anilino-diphenylamines, and diaminonaphthalenes, such as N,N,N',N'-tetraalkylaminonaphthalenes.

The copolymers and compositions made thereof have been processed into shaped articles such as fibers, films, laminates, tubes, piping and articles having an intricate shape by conventional processing techniques, such as melt spinning, extrusion, and co-extrusion, injection molding and compression molding. It appeared that the copolymers of the invention perform better than copolymers which have been prepared by a different process, and that the process of the invention renders certain types of copolymers processable which were otherwise not processable due to insufficient stability under the conditions of the particular processing method.

The invention is now illustrated by the following non-limiting example.

EXAMPLE

A powder sample (30 g) of a terpolymer comprising ethylene, propylene and carbon monoxide, having an LVN of 1.5 dl/g (measured in m-cresol at 60° C.) and a crystalline melting point of 220° C., was suspended in 100 ml methanol in which oxalic acid was dissolved at a concentration of 10 g/l. After agitating the suspension for 10 minutes, the polymer was recovered by filtration. The polymer was dried at reduced pressure (less than 20 kPa) using a nitrogen purge. A sample of the dried material was analyzed by thermal gravimetric analysis which involves monitoring the weight of the sample under carefully controlled conditions. Over a 30 minute period, the average weight loss at 260° C. in nitrogen amounted to 1.3%/hour. Another sample of the dried polymer was compression molded in a press between glass-reinforced poly-perfluoroethylene sheets, using a 1-mm spacer between the sheets, by pressing at 250° C. for 10 minutes. A colorless molding was obtained.

COMPARATIVE EXAMPLE

Another sample of the same polymer as used in the Example was treated in exactly the same way as described above, except that the solution of oxalic acid in methanol was replaced by pure methanol. The average weight loss amounted to 2.1%/hour. A yellowish molding was obtained.

From the Example and the Comparative Experiment it is apparent that the washing step which comprises contacting the polymer with methanol containing oxalic acid has had a beneficial influence on the polymer's stability as judged from the rate of weight loss at high temperature and development of color upon compression molding.

What is claimed is:

1. A process for preparing copolymers of carbon monoxide and at least one olefinically unsaturated compound comprising:
   copolymerizing the monomers in the presence of a catalyst composition containing a Group-VIII metal, and
   washing the formed copolymer by contacting the copolymer with a liquid comprising a dicarboxylic or tricarboxylic acid having up to 8 carbon atoms, or a zinc, aluminium or magnesium salt thereof, dissolved in a solvent.

2. The process of claim 1, wherein the liquid contains a dicarboxylic or tricarboxylic acid.

3. The process of claim 2, wherein the liquid contains a dicarboxylic acid.

4. The process of claim 3, wherein the liquid contains oxalic acid.

5. The process of claim 1 wherein the carboxylic acid is an acid which decomposes into volatile products when heated at a temperature in the range of from 100° to 300° C.

6. The process of claim 1, wherein the concentration of the dicarboxylic or tricarboxylic acid or the zinc, aluminium or magnesium salt in the liquid amounts to 0.1 to 200 g/l.

7. The process of claim 6, wherein the concentration of the dicarboxylic or tricarboxylic acid or the zinc, aluminium or magnesium salt in the liquid amounts to 1 to 50 g/l.

8. The process of claim 7, wherein the concentration of the dicarboxylic or tricarboxylic acid or the zinc, aluminium or magnesium salt in the liquid amounts to 5 to 20 g/l.

9. The process of claim 1 wherein the solvent is essentially organic.

10. The process of claim 9, wherein the solvent comprises a liquid alcohol having up to 5 carbon atoms.

11. The process of claim 10, wherein the liquid alcohol is an alcohol having up to 3 carbon atoms.

12. The process of claim 11, wherein the alcohol is methanol.

13. The process of claim 1, wherein the copolymer is a copolymer of carbon monoxide and ethylene.

14. The process of claim 1, wherein the copolymer is a copolymer of carbon monoxide, ethylene, and propylene.

15. A process for preparing copolymers of carbon monoxide and at least one olefinically unsaturated compound comprising:
   copolymerizing the monomers in the presence of a catalyst composition comprising a Group-VIII metal;
   washing the formed copolymer by contacting the copolymer with a first liquid comprising a dicarboxylic, or tricarboxylic acid having up to 8 carbon atoms, or a zinc, aluminum, or magnesium salt thereof, dissolved in a solvent; and subsequently washing the copolymer with a second liquid, consisting essentially of the solvent.

16. The process of claim 15, wherein the solvent is a liquid alcohol having up to 5 carbon atoms and the first liquid contains a dicarboxylic acid.

17. The process of claim 16, wherein the solvent is methanol and the first liquid contains oxalic acid.

18. The process of claim 17, wherein the copolymer is a copolymer of carbon monoxide and ethylene.

19. The process of claim 18, wherein the copolymer is a copolymer of carbon monoxide, ethylene, and propylene.

20. A composition comprising a copolymer of carbon monoxide and at least one olefinically unsaturated compound formed by the process comprising:
copolymerizing the monomers in the presence of a catalyst composition comprising a Group-VIII metal;
washing the formed copolymer by contacting the copolymer with a first liquid comprising a dicarboxylic, or tricarboxylic acid having up to 8 carbon atoms, or a zinc, aluminum, or magnesium salt thereof, dissolved in a solvent; and
subsequently washing the copolymer with a second liquid, consisting essentially of the solvent.

* * * * *